United States Patent
Lin et al.

(10) Patent No.: US 9,903,553 B2
(45) Date of Patent: Feb. 27, 2018

(54) LIGHT-GUIDING PILLAR AND VEHICLE LAMP USING THE SAME

(71) Applicant: Lextar Electronics Corporation, Hsinchu (TW)

(72) Inventors: Yu-Min Lin, New Taipei (TW); Shih-Kai Lin, Tainan (TW); Mong-Ea Lin, Taichung (TW)

(73) Assignee: Lextar Electronics Corporation (TW)

( * ) Notice: Subject to any disclaimer, the term of this patent is extended or adjusted under 35 U.S.C. 154(b) by 92 days.

(21) Appl. No.: 15/054,703

(22) Filed: Feb. 26, 2016

(65) Prior Publication Data
US 2017/0009951 A1   Jan. 12, 2017

(30) Foreign Application Priority Data
Jul. 6, 2015   (TW) .............................. 104121879 A

(51) Int. Cl.
  *F21V 9/00*   (2015.01)
  *F21S 8/10*   (2006.01)
  *F21V 8/00*   (2006.01)

(52) U.S. Cl.
  CPC ......... *F21S 48/1241* (2013.01); *F21S 48/115* (2013.01); *F21S 48/1154* (2013.01); *F21S 48/125* (2013.01); *F21S 48/1258* (2013.01); *F21S 48/1329* (2013.01); *F21S 48/1388* (2013.01); *G02B 6/0096* (2013.01); *F21S 48/1208* (2013.01); *F21S 48/145* (2013.01); *F21S 48/328* (2013.01)

(58) Field of Classification Search
  CPC .......................... F21S 48/1241; F21S 48/1329
  See application file for complete search history.

(56) References Cited

U.S. PATENT DOCUMENTS

| | | | |
|---|---|---|---|
| 7,611,272 B2 | 11/2009 | Specht et al. | |
| 8,152,352 B2 * | 4/2012 | Richardson | G02B 6/0036 362/615 |
| 2009/0016074 A1 | 1/2009 | Dolson et al. | |
| 2009/0027910 A1 * | 1/2009 | Nagasawa | F21S 48/1159 362/518 |

(Continued)

FOREIGN PATENT DOCUMENTS

| | | |
|---|---|---|
| CN | 202469885 U | 10/2012 |
| CN | 103206639 A | 7/2013 |

(Continued)

*Primary Examiner* — Evan Dzierzynski
(74) *Attorney, Agent, or Firm* — Hayes Soloway PC

(57) ABSTRACT

A light-guiding pillar used in a vehicle lamp includes a major structure and a light-guiding structure. The major structure has a light incident surface, a light outgoing surface, an upper surface, and a bottom surface. The upper surface and the bottom surface are disposed between the light incident surface and the light outgoing surface, in which the upper surface and the bottom surface are opposite to each other. The major structure is configured to guide a portion of a light beam entering the major structure through the light incident surface to the light caving surface. The light-guiding structure is disposed on the upper surface and configured to guide another portion of the light beam entering the major structure through the light incident surface from the upper surface to the bottom surface with passing through the bottom surface.

20 Claims, 11 Drawing Sheets

(56) References Cited

U.S. PATENT DOCUMENTS

| | | | |
|---|---|---|---|
| 2010/0103694 A1 | 4/2010 | Saxena et al. | |
| 2015/0042968 A1* | 2/2015 | Takauchi | G03B 21/2066 353/99 |
| 2015/0153017 A1* | 6/2015 | Hu | G02F 1/1336 362/97.1 |
| 2015/0176793 A1 | 6/2015 | Park et al. | |
| 2016/0040847 A1* | 2/2016 | Ikuta | F21S 48/215 362/516 |
| 2016/0082881 A1* | 3/2016 | Yamato | B60Q 3/78 362/511 |

FOREIGN PATENT DOCUMENTS

| | | |
|---|---|---|
| CN | 203215562 U | 9/2013 |
| CN | 103890622 A | 6/2014 |
| CN | 203949100 U | 11/2014 |
| CN | 104251443 A | 12/2014 |
| CN | 204045629 U | 12/2014 |
| CN | 104728725 A | 6/2015 |
| CN | 105745488 A | 7/2016 |
| DE | 102011000697 A1 | 8/2012 |
| DE | 102014007185 A1 | 12/2014 |
| EP | 1630576 A2 | 3/2006 |
| EP | 2525141 A1 | 11/2012 |
| FR | 2907535 A1 | 4/2008 |
| JP | 2009-070679 A | 4/2009 |
| JP | 2013-110068 A | 6/2013 |
| JP | 2015-011976 A | 1/2015 |
| JP | 2015-079660 A | 4/2015 |
| JP | 2015-099689 A | 5/2015 |
| TW | 201447405 A | 12/2014 |
| WO | 2014056568 A1 | 4/2014 |
| WO | 2014156668 A1 | 10/2014 |
| WO | 2014174843 A1 | 10/2014 |
| WO | 2015040671 A1 | 3/2015 |
| WO | 2015076203 A1 | 5/2015 |

* cited by examiner

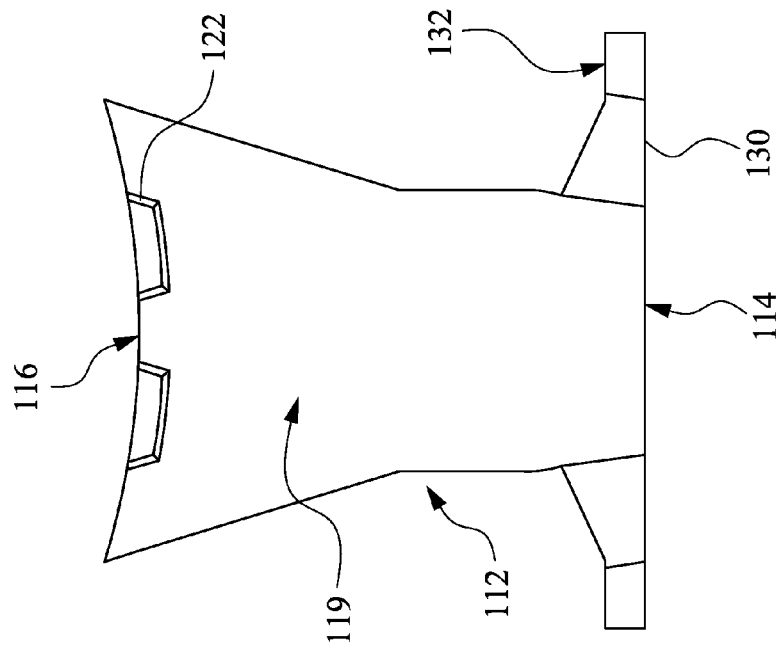
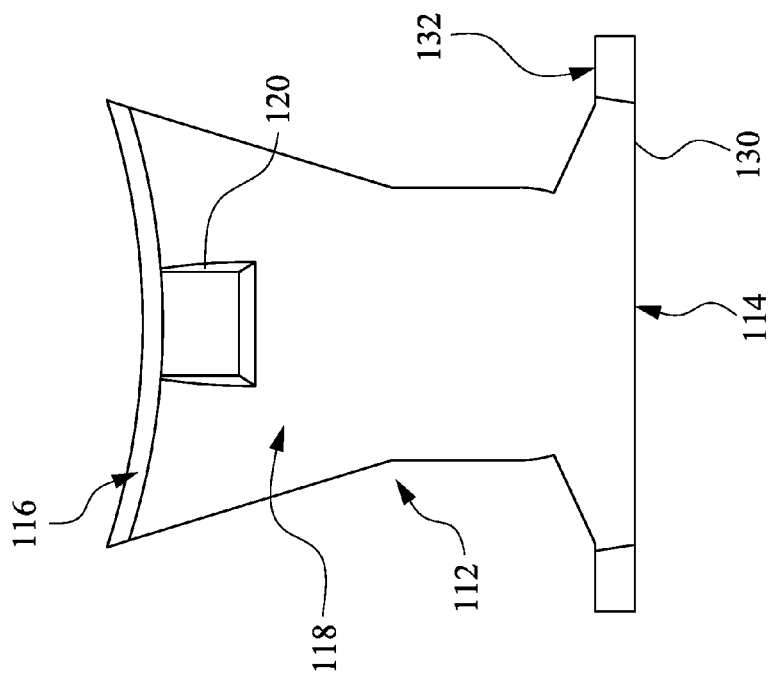

LIGHT-GUIDING PILLAR AND VEHICLE LAMP USING THE SAME

RELATED APPLICATIONS

This application claims priority to Taiwanese Application Serial Number 104121879, filed Jul. 6, 2015, which is herein incorporated by reference.

BACKGROUND

Technical Field

The present disclosure relates to a light-guiding pillar and a vehicle using the same.

Description of Related Art

The vehicular luminary has already been one of the key development projects in the field of lighting. In recent years, light-emitting diodes (LEDs) have gradually replaced the conventional light sources applied in the vehicular luminaries because LEDs have advantages such as high luminous efficacy, high brightness, low power consumption and instant response.

However, due to the shape and size of LEDs emitting surface, there are various problems in focusing design to be solved if the optical system in vehicular luminaries is projection type or PES type. As a result, there is still room to improve optical efficiency of different vehicle lighting systems under the condition of complying with the relative regulations of vehicle lighting.

SUMMARY

An aspect of the present disclosure provides a vehicle lamp. In the vehicle lamp, with a light-guiding structure of a light-guiding pillar, light beam emitted from a light source can pass through a light outgoing surface and a bottom surface of the light-guiding pillar, in which the light beams emitted from the light outgoing surface and the bottom surface of the light-guiding pillar can be respectively projected to form a bright zone and a dark zone of an illuminating area. Therefore, there is faint light in the dark zone of the illuminating area to make the dark zone not complete dark. Furthermore, via a concave structure, the testing points near cut-off line on the light pattern projected by the vehicle lamp are modified to comply with the relative regulation.

An aspect of the present disclosure provides a light-guiding pillar including a major structure and a light-guiding structure. The major structure has a light incident surface, a light outgoing surface, an upper surface, and a bottom surface. The upper surface and the bottom surface are disposed between the light incident surface and the light outgoing surface, in which the upper surface and the bottom surface are opposite to each other. The major structure is configured to guide light beams from the light incident surface to the light outgoing surface. The light-guiding structure is disposed on the upper surface and configured to guide a portion of light beams which are reflected from the major structure to pass through the bottom surface.

In some embodiments, the light-guiding pillar further includes a concave structure disposed on the bottom surface, in which the concave structure is adjacent be the light outgoing surface and is configured to define a boundary of the light beam emitted from the light outgoing surface.

In some embodiments, at least one of the upper surface and the bottom surface is a curved surface protruding outward from the major structure.

In some embodiments, the light outgoing surface is a surface that is curved and inward concave into the major structure.

In some embodiments, a vertical distance between the light incident surface and the light outgoing surface is increasing or decreasing from a boundary between the light outgoing surface and the upper surface to a boundary between the light outgoing surface and the bottom surface.

In some embodiments, the light-guiding structure is adjacent to the light outgoing surface.

In some embodiments, the major structure is a hollow structure and has a hole, and the light beam guided by the light-guiding structure passes through the bottom surface via the hole.

In some embodiments, the major structure is a solid structure, and the light-guiding structure is a concave configuration configured to define a total internal reflection interface.

In some embodiments, the light-guiding pillar further includes a positioning portion disposed on the major structure and including at least one positioning hole.

An aspect of the present disclosure provides a vehicle lamp including a heat-dissipation base, a light source, a light-guiding pillar, and a condenser lens. The light source is disposed on the heat-dissipation base and configured to provide a light beam. The light-guiding pillar is disposed on the heat-dissipation base and includes a major structure and a light-guiding structure. The major structure has a light incident surface, a light outgoing surface, an upper surface and a bottom surface. The upper surface and the bottom surface are disposed between the light incident surface and the light outgoing surface, in which the upper surface and the bottom surface are opposite to each other. The light incident surface is configured to receive the light beam provided by the light source. The major structure is configured to guide a portion of the light beam entering the major structure through the light incident surface to the light outgoing surface. The light-guiding structure is disposed on the upper surface and configured to guide another portion of the light beam entering the major structure through the light incident surface from the upper surface to the bottom surface with passing through the bottom surface. The condenser lens is configured to receive the light beam provided by the light outgoing surface and the bottom surface.

In some embodiments, the condenser lens has a focal plane, and a portion of the focal plane and the light outgoing surface are coincident with each other.

In some embodiments, the condenser lens has a focal plane, and the focal plane and the light outgoing surface are at least intersected at a straight line.

In some embodiments, the light-guiding pillar further includes a positioning portion disposed on the major structure, and the positioning portion includes at least one positioning hole. The vehicle lamp vehicle further includes at least one positioning element, and the positioning element is fastened on the heat-dissipation base via the positioning hole to fix the major structure on the heat-dissipation base.

BRIEF DESCRIPTION OF THE DRAWINGS

FIG. 2B is a top view of a light-guiding pillar of the vehicle lamp illustrated in FIG. 1;

FIG. 2C is a bottom view of a light-guiding pillar of the vehicle lamp illustrated in FIG. 1;

DETAILED DESCRIPTION

Figure 1:
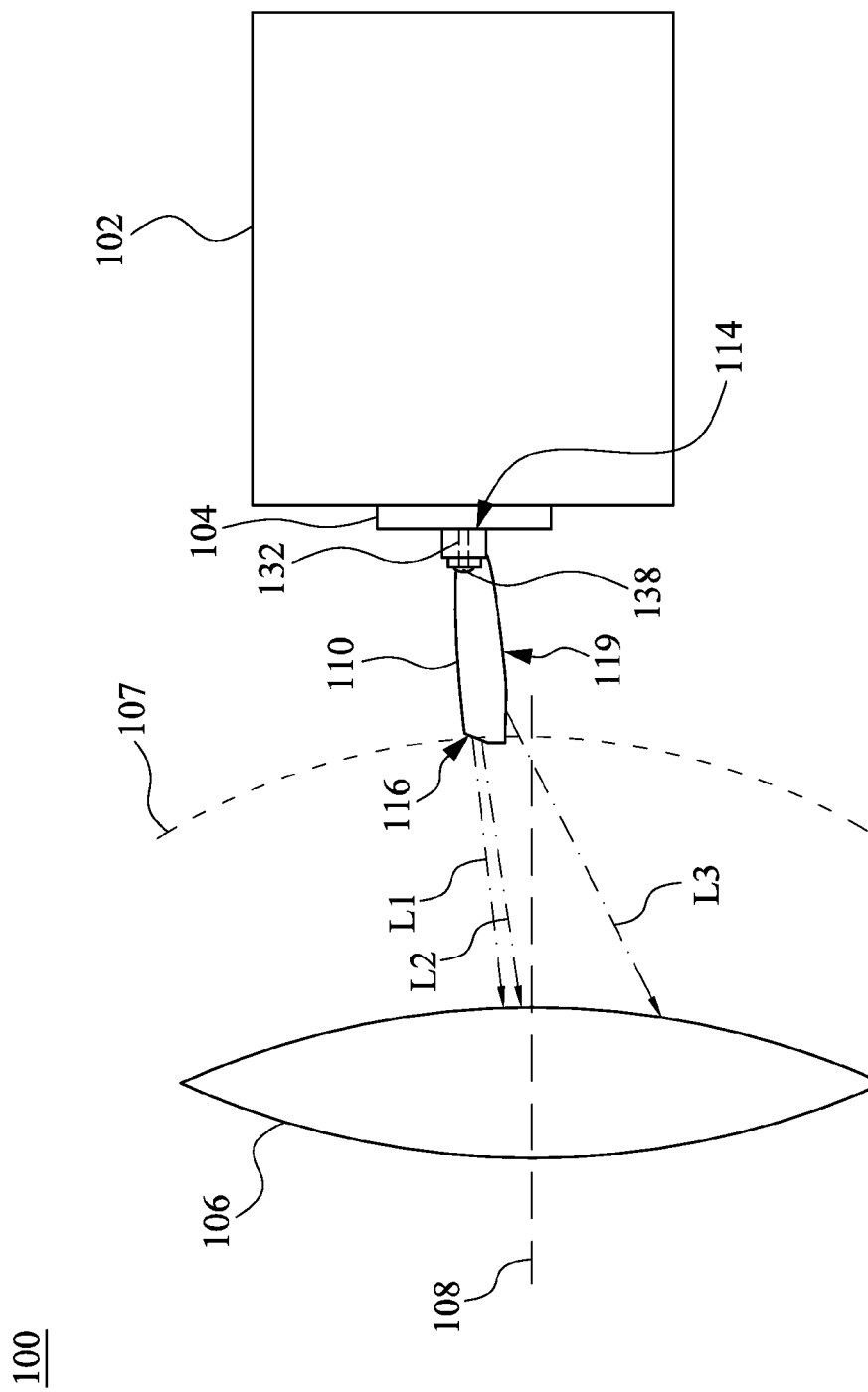
FIG. 1 is a side view of a vehicle lamp according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a problem that shape or range of illumination provided by a vehicle lamp may not comply with the regulations of vehicle lighting as the light emitting diodes (LEDs) are applied to the vehicle lamp to improve a lighting performance. In the vehicle lamp of the present disclosure, with a light-guiding structure of a light-guiding pillar, light beam provided by a light source can be emitted from a light outgoing surface and a bottom surface of the light-guiding pillar, in which the light beams emitted from the light outgoing surface and the bottom surface of the light-guiding pillar can be respectively projected to a bright zone and a dark zone of an illuminating area. Therefore, there is faint light in the dark one of the illuminating area to make the dark zone not complete dark.

FIG. 1 is a side view of a vehicle lamp 100 according to a first embodiment of the present disclosure. A vehicle lamp 100 includes a heat-dissipation base 102, a light source 104, a light-guiding pillar 110, and a condenser lens 106. The light source 104 is disposed on the heat-dissipation base 102 and configured to provide a light beam, in which the light source 104 may have LEDs or LED chips. The light-guiding pillar 110 is disposed on the heat-dissipation base 102, in which a light incident surface 114 of the light-guiding pillar 110 is configured to receive the light beam provided by the light source 104. The condenser lens 105 is configured to receive the light beams L1, L2, and L3 provided by a light outgoing surface 116 and a bottom surface 119 of the light-guiding pillar 110. The condenser lens 106 has an optical axis 108, in which the light-guiding pillar 110 is disposed at a side of the optical axis 108.

As shown in FIG. 1, the light-guiding pillar 110 is disposed at an upper side of the optical axis 108. The light-guiding pillar 110 is configured to modify a shape of the light beam provided by the light source 104. Therefore, after the light beam provided by the light source 104 is modified by the light-guiding pillar 110, the condenser lens 106 can project a light beam with a shape meeting the regulations of vehicle lighting. The following descriptions are provided with respect to a structure of the light-guiding pillar 110 and a modification of the shape of the light beam thereof.

Figure 2A:
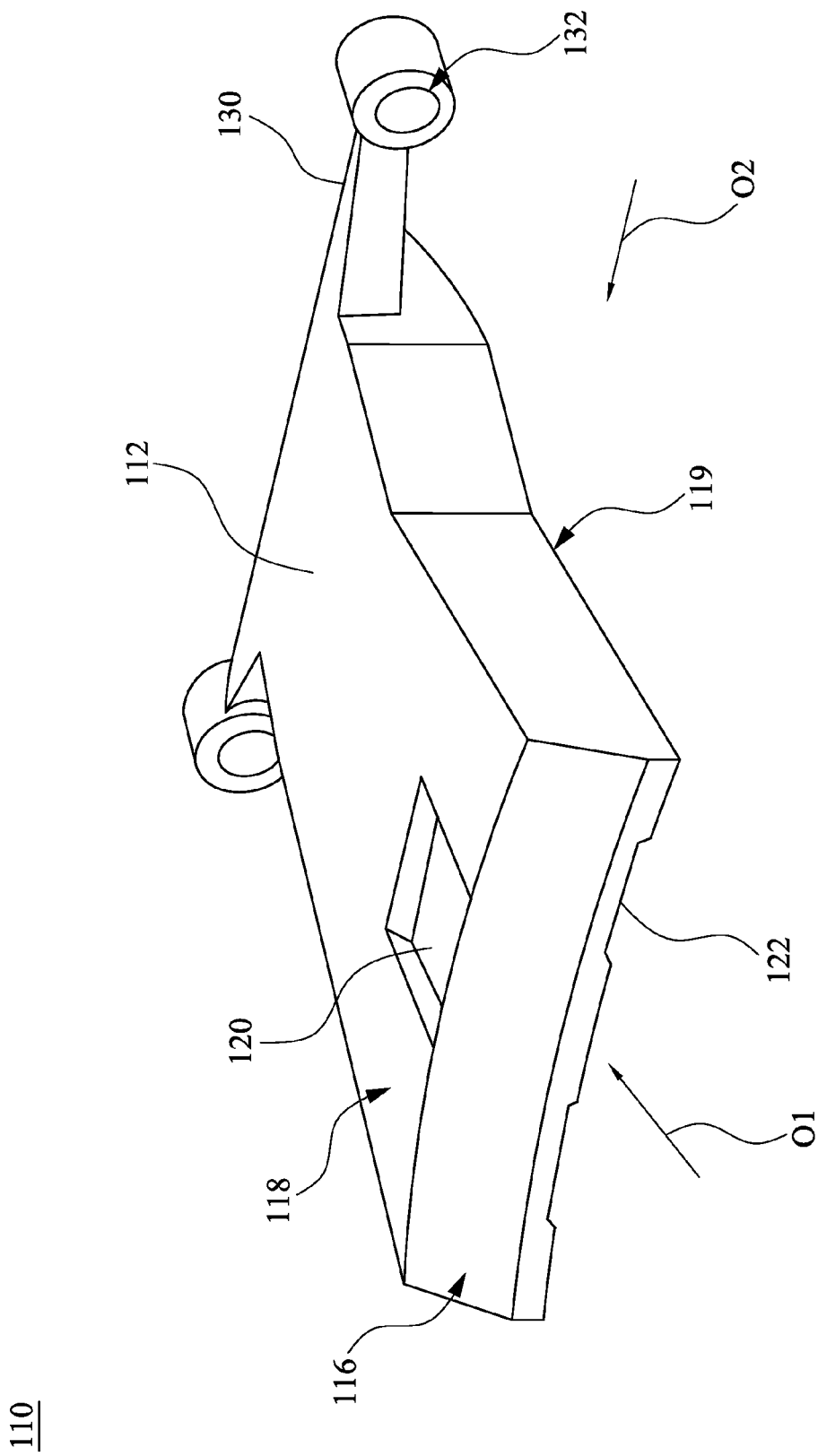
FIG. 2A is a perspective view of a light-guiding pillar of the vehicle lamp illustrated in FIG. 1.
Figure 2D:
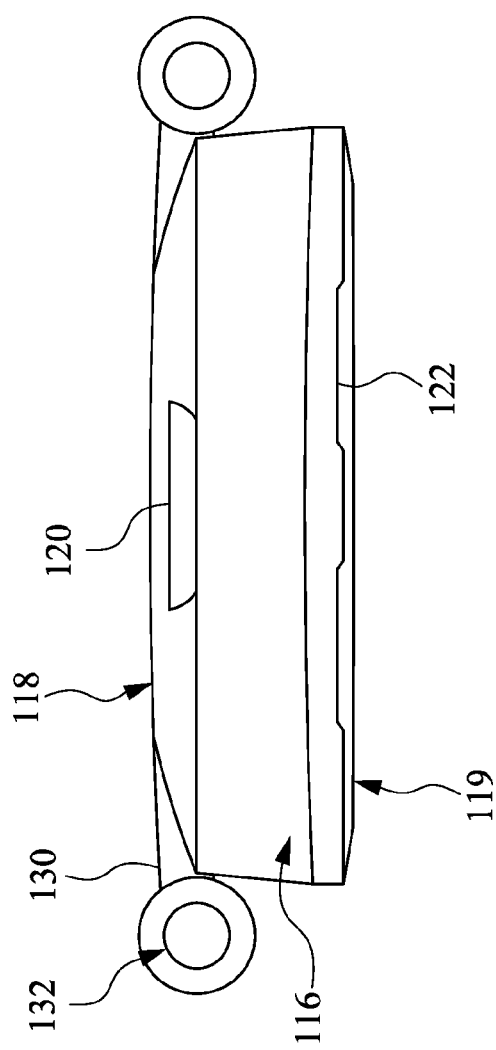
FIG. 2D is a schematic diagram of the light-guiding pillar viewed along a sight line O1 illustrated in FIG. 2A.
Figure 2E:
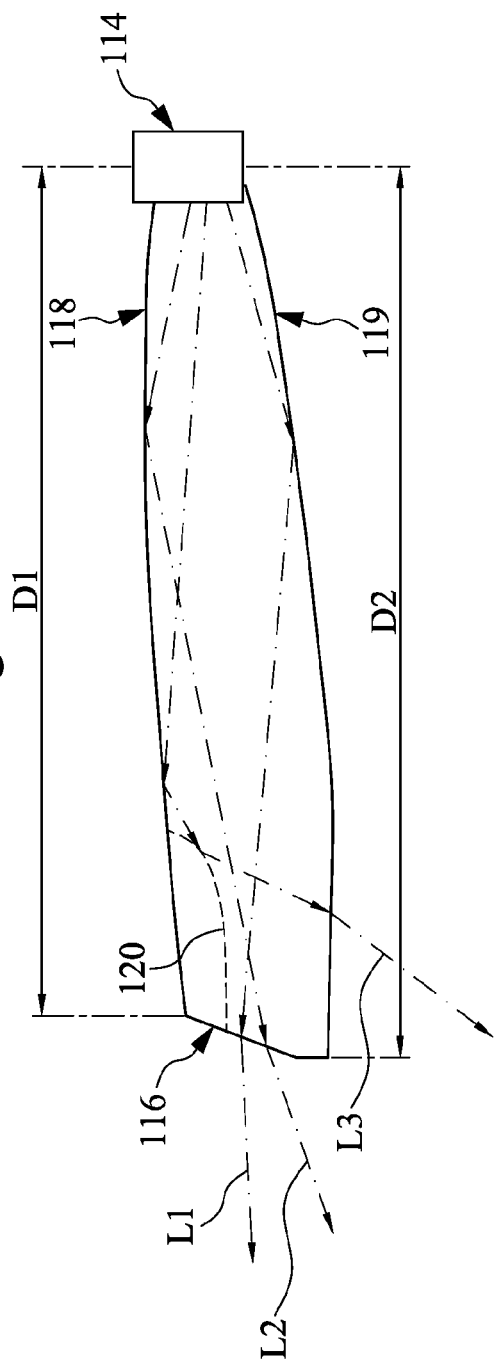
FIG. 2E is a schematic diagram of the light-guiding pillar viewed along a sight line O2 illustrated in FIG. 2A.

FIG. 2A is a perspective view of a light-guiding pillar 110 of the vehicle lamp 100 illustrated in FIG. 1. FIG. 2B is a top view of a light-guiding pillar 110 of the vehicle lamp 100 illustrated in FIG. 1. FIG. 2C is a bottom view of a light-guiding pillar 110 of the vehicle lamp 100 illustrated in FIG. 1. FIG. 2D is a schematic diagram of the light-guiding pillar 110 viewed along a sight line O1 illustrated in FIG. 2A. FIG. 2E is a schematic diagram of the light-guiding pillar 110 viewed along a sight line O2 illustrated in FIG. 2A.

The light-guiding pillar 110 includes a major structure 112 and a light-guiding structure 120. In the present embodiments, the major structure 112 is a solid structure. The major structure 112 has the light incident surface 114, the light outgoing surface 116, an upper surface 118, and the bottom surface 119. The upper surface 116 and the bottom surface 119 are disposed between the light incident surface 114 and the light outgoing surface 116, in which the upper surface 118 and the bottom surface 119 are opposite to each other. The major structure 112 is configured to guide a portion of the light beam entering the major structure 112 through the light incident surface 114 to the light outgoing surface 116, in which the light beams guided from the light incident surface 114 to the light outgoing surface 116 are illustrated as light beams L1 and L2 in FIG. 2E.

Furthermore, in the present embodiment, each of the upper surface 118 and the bottom surface 119 is a curved surface protruding outward from the major structure 112. By the curved surfaces of the upper surface 118 and the bottom surface 119, a portion of the light beam entering through the light incident surface 114 can be focused on the light outgoing surface 116 so as to improve the optical performance of the major structure 112, but are not limited thereto. For example, in some embodiments, one of the upper surface 118 and the bottom surface 119 is a curved surface protruding outward from the major structure 112.

The light-guiding structure 120 is disposed on the upper surface 118 and is adjacent to the light outgoing surface 116. The light-guiding structure 120 is configured to guide another portion of the light beam entering the major structure 112 through the light incident surface 114 from the upper surface 118 to the bottom surface 119 with passing through the bottom surface 119, in which the light beam guided from the upper surface 118 to the bottom surface 119 with passing through the bottom surface 119 is illustrated as the light beam L3 in FIG. 2E. In addition, the light-guiding structure 120 is a concave configuration configured to define a total internal reflection interface.

In FIG. 1, the light-guiding pillar 110 can make the light beam provided by the light source 104 propagated from the light outgoing surface 116 and the bottom surface 119 of the major structure 112 to the condenser lens 106, in which the light outgoing surface 116 and the bottom surface 119 are surfaces of the major structure 112 that are adjacent to each other.

Figure 3:
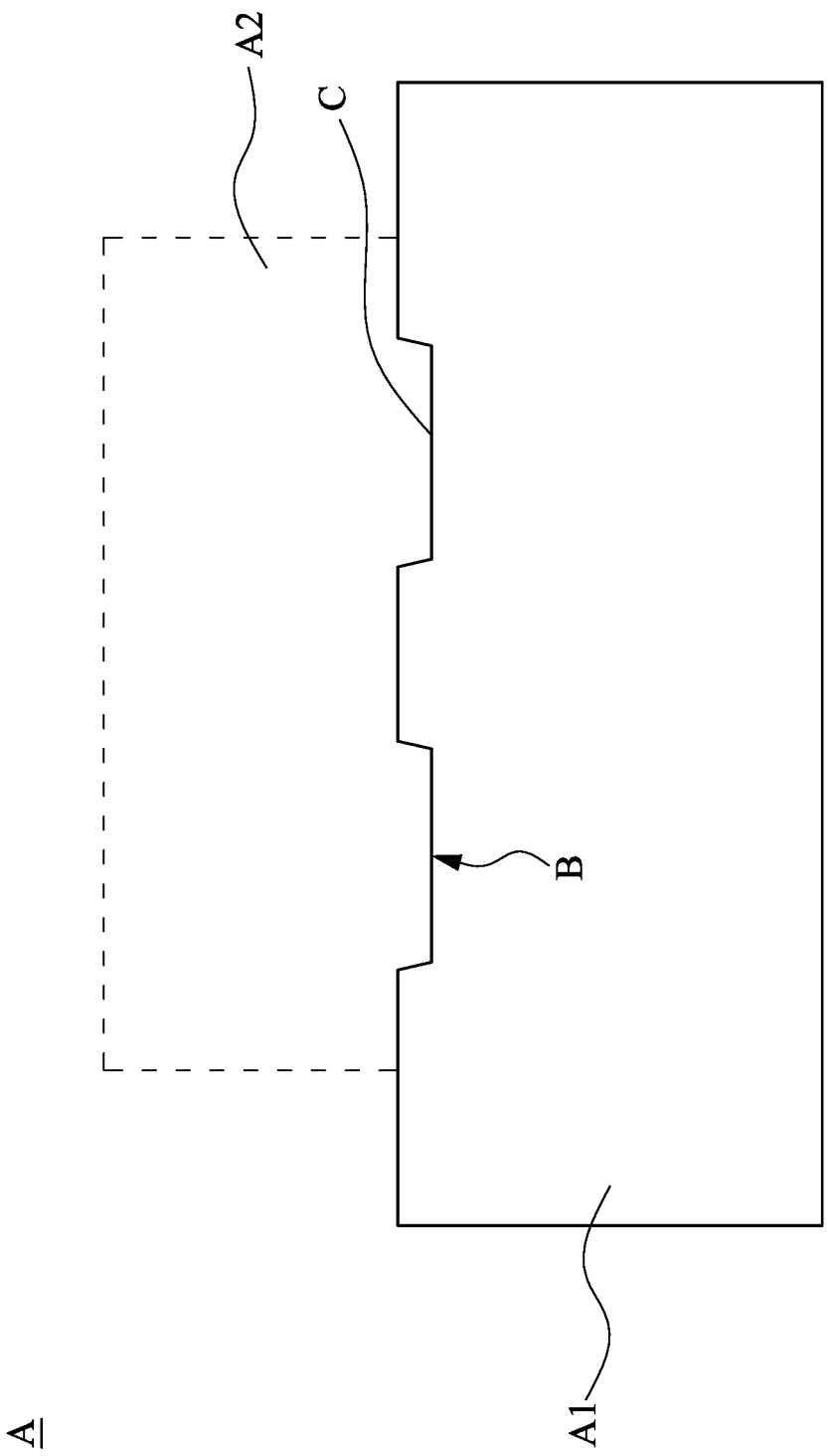
FIG. 3 is a schematic diagram of a shape of alight beam projected by the vehicle lamp illustrated in FIG. 1.

FIG. 3 is a schematic diagram of a shape of a light beam projected by the vehicle lamp 100 illustrated in FIG. 1. As shown in FIGS. 1 and 3, when the vehicle lamp 100 projects the light beam to a testing screen (a white screen or a white wall), an illuminating area A (or a zone of brightness distribution) shown on the testing screen is illustrated in FIG. 3. The illuminating area A includes a bright zone A1 (a zone within the solid line), a dark zone A2 (a zone within the dot line), and a cutoff line C between the bright zone A1 and the dark zone A2. The bright zone A1 of the illuminating area A is formed by projecting the light beam by the condenser lens 106, in which the light beam projected by the condenser lens 106 is provided by the light outgoing surface 116.

In FIG. 1, by a refract mechanism provided by the condenser lens 106, the light beams L1, L2, and L3 provided by the light-guiding pillar 110 can be respectively projected to corresponding positions in the illuminating area A. In the refract mechanism provided by the condenser lens 106, according to the imaging rule in a geometrical optics, the image formed by the light beam provided by the light-guiding pillar 110 and the image formed by the light beam projected by the condenser lens 106 are reverse (thus, after projected by the condenser lens 106, the image on the illuminating area A is upside down).

When the light beams L1 and 12 provided by the light-guiding pillar 110 are emitted toward the condenser lens 106 from the light outgoing surface 116, according to the refract mechanism provided by the condenser lens 106, the light beams L1 and 12 emitted from the light outgoing surface 116 are projected to the bright zone A1 (the bottom side in the testing screen) since the incident positions of the light beams L1 and 12 entering the condenser lens 106 are at the upper side of the optical axis 108. When the light beam L3 provided by the light-guiding pillar 110 is emitted toward the condenser lens 106 from the bottom surface 119, according to the refract mechanism provided by the condenser lens 106, the light beam L3 emitted from the bottom surface 119 is projected to the dark zone A2 (the upper side in the testing screen) since the incident position of the light beam L3 entering the condenser lens 106 is at the bottom side of the optical axis 108.

Thus, in the illuminating area A that the vehicle lamp 100 projects the light beam thereon, there is faint light in the dark zone A2 above the cutoff line C to make the dark zone not complete dark. In other words, a portion of the light beam provided by the light source 104 can be guided to the dark zone A2 by the light-guiding structure 120 (see FIG. 2A) to improve the brightness in the dark zone A2. Therefore, the light-guiding structure 120 (see FIG. 2A) can be taken as a brightness-improving structure for the dark zone. Moreover, since the light beam configured to improve the brightness in the dark zone A2 is a portion of the light beam provide by the light source 104, the brightness of the dark zone A2 after improving still can meet the regulations of vehicle lighting. The following descriptions are provided with respect to the structure configured to modify the shape of the projected light beam in detail.

Referring back to FIGS. 2A to 2E and 3. The light-guiding pillar 110 further includes a concave structure 122. The concave structure 122 is disposed on the bottom surface 119 and is adjacent to the light outgoing surface 116. The concave structure 122 is configured to define a boundary of the light beam emitted from the light outgoing surface 116. As previous described, the bright zone A1 of the illuminating area A is formed by the light beam provided by the light outgoing surface 116, and the image formed by the light beam provided by the light-guiding pillar 110 and the image formed by the light beam projected by the condenser lens 106 are reverse. Therefore, the concave structure 122 disposed on the bottom surface 119 can define a boundary B at an upper edge of the bright zone A1 of the illuminating area A. In other words, the concave structure 122 disposed on the bottom surface 119 of the major structure 112 and adjacent to the light outgoing surface 116 can define a shape near the cutoff line C in the illuminating area A, as shown in FIG. 3. Therefore, by the concave structure 122, in the shape of the light beam provided by the vehicle lamp, testing points near the cutoff line C can be modified to meet the regulations of vehicle lighting.

Referring back to FIGS. 1 and 2A to 2E. The light outgoing surface 116 is a surface that is curved and inward concave into the major structure 112. By the light outgoing surface 116 that is curved and inward concave into the major structure 112, the light-guiding pillar 110 can effectively guide the light beam form the light incident surface 114 to the light outgoing surface 116. For example, the light outgoing surface 116 that is curved and inward concave into the major structure 112 can provide the light beam with focusing on the light outgoing surface 116. Furthermore, a horizontal dimension of the light outgoing surface 116 can be greater than the light incident surface 114.

In addition, in the present embodiment, a vertical distance between the light incident surface 114 and the light outgoing surface 115 is increasing from a boundary between the light outgoing surface 116 and the upper surface 118 to a boundary between the light outgoing surface 116 and the bottom surface 119. For example, the vertical distance between the light incident surface 114 and the boundary between the light outgoing surface 116 and the upper surface 118 is distance D1, the vertical distance between the light incident surface 114 end the boundary between the light outgoing surface 116 and the bottom surface 119 is distance D2, and the distance D1 is smaller than the distance D2. Thus, the light outgoing surface 116 is not a vertical surface. In the arrangement between the light-guiding pillar 110 and the condenser lens 106 illustrated in FIG. 1, the light outgoing surface 116 can be taken as a backward surface, such that a focal plane 107 of the condenser lens 106 and the light outgoing surface 116 can at least intersect at a straight line. In other words, the light outgoing surface 116 is disposed near the focal plane 107 but is not totally matched with the focal plane 107 together.

Under this configuration, the illumination provided by the vehicle lamp 100 can be provided with an effect of misting. For example, in the bright zone A1 illustrated in FIG. 3, on three boundaries expect the cutoff line C, the boundaries between the light and dark zones provided by the vehicle lamp 100 can be misted. Furthermore, the backward light outgoing surface 116 can be configured to adjust an emitting angle of the light beam provided by the vehicle lamp 100, such that the projected location of the light beam provided by the vehicle lamp 100 on the ground (thus the ground in front of the vehicle lamp 100) can be controlled to be more close to a vehicle with the vehicle lamp 100 of the present disclosure.

In addition, the light-guiding pillar 110 further includes a positioning portion 130. The positioning portion 130 is disposed on the major structure 112. The positioning portion 130 includes positioning holes 132. The vehicle lamp 100 further includes at least one positioning element 136. The positioning element 138 is fastened on the heat-dissipation base 102 via the positioning hole 132 to fix the major structure 112 on the heat-dissipation base 102, as show in FIG. 1. In the present embodiment, the major structure 112 and the positioning portion 130 are formed by one-piece, but are not limited thereto.

As described above, the vehicle lamp 100 of the present disclosure can improve the brightness in the dark zone of the illuminating area A through the light-guiding structure 120, such that the dark zone A2 of the illuminating area A can have the certain brightness. Furthermore, the shape of the light or the illumination provided by the vehicle lamp 100 can be modified by the various structures of the light-guiding pillar 110, thereby improving the optical performance of the vehicle lamp 100 and making the shape of the light or the illumination provided by the vehicle lamp 100 meet the regulations of vehicle lighting.

Figure 4:
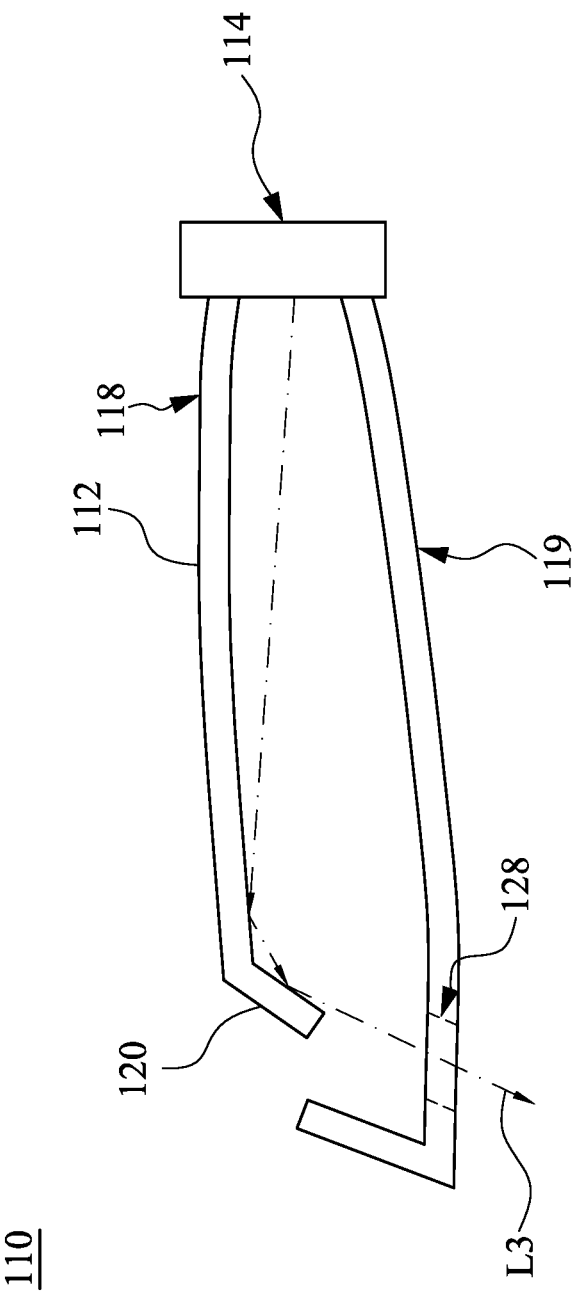
FIG. 4 is a side view of a light-guiding pillar of a vehicle lamp according to a second embodiment of the present disclosure.

FIG. 4 is a side view of a light-guiding pillar 110 of a vehicle lamp 100 according to a second embodiment of the present disclosure. The difference between the present embodiment and the first embodiment is that the major structure 112 of the present embodiment is a hollow structure.

In the present embodiment, the major structure 112 with the hollow structure can be taken as a shell structure. The major structure has a hole 128. The hole 128 is disposed at the bottom surface 119. Similarly, the light-guiding structure 120 is configured to guide the light beam L3 entering the major structure 112 through the light incident surface 114 from the upper surface 116 to the bottom surface 119 with penetrating the bottom surface 119.

Under this configuration, the light beam L3 guided by the light-guiding structure 120 can pass through the bottom surface 119 via the hole 128. Similarly, after the light beam L3 passing through the bottom surface 119 via the hole 128 is collected by the condenser lens 106 (see FIG. 1), with the refract mechanism provided by the condenser lens 106 (see FIG. 1), the light beam L3 can be projected to the dark zone A2 of the illuminating area A (see FIG. 3).

Figure 5:
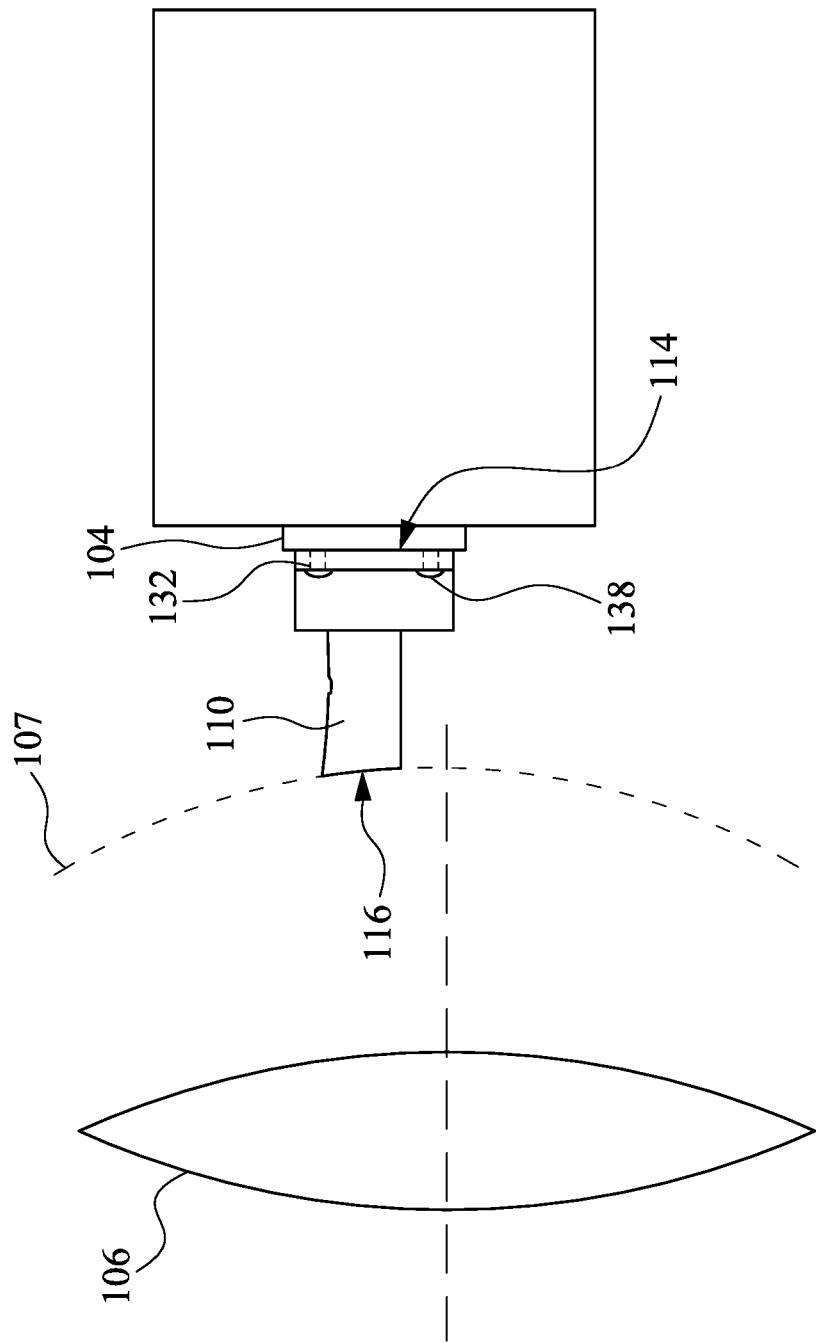
FIG. 5 is a side view of a vehicle lamp according to a third embodiment of the present disclosure.
Figure 6A:
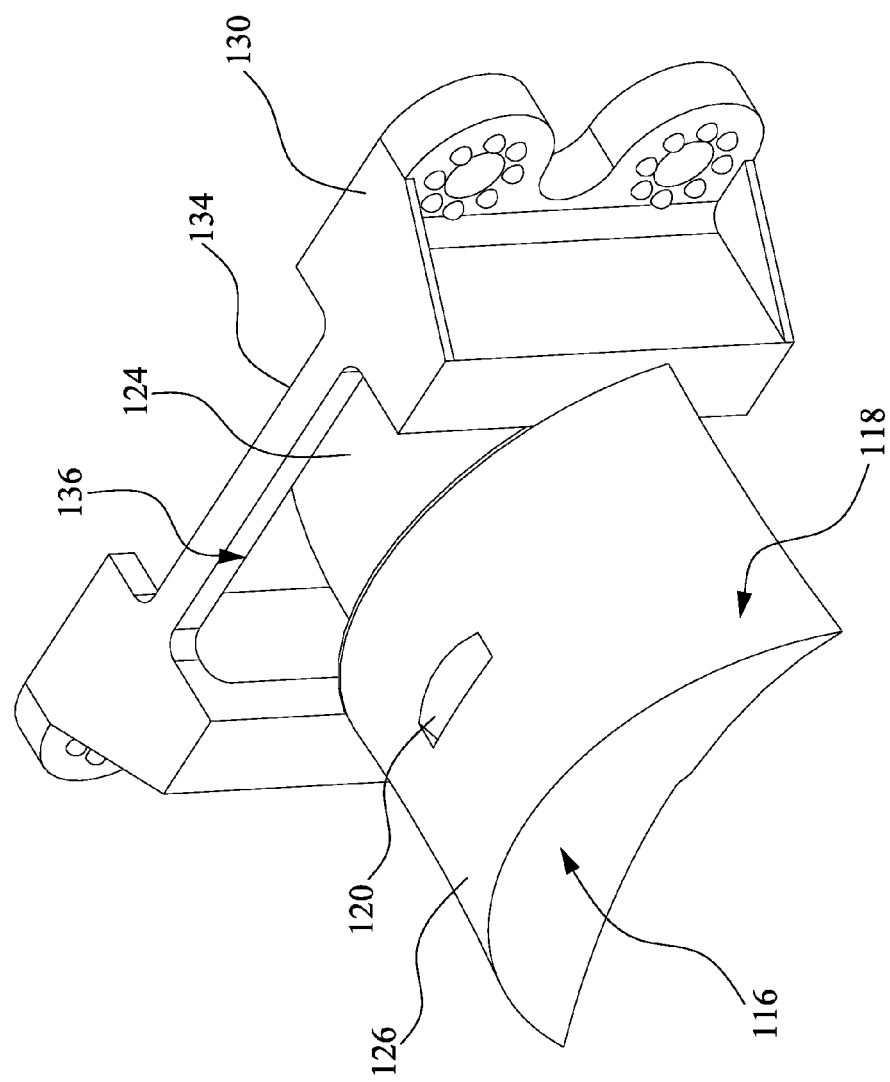
FIG. 6A is a perspective view of a light-guiding pillar of the vehicle lamp illustrated in FIG. 5.
Figure 6B:
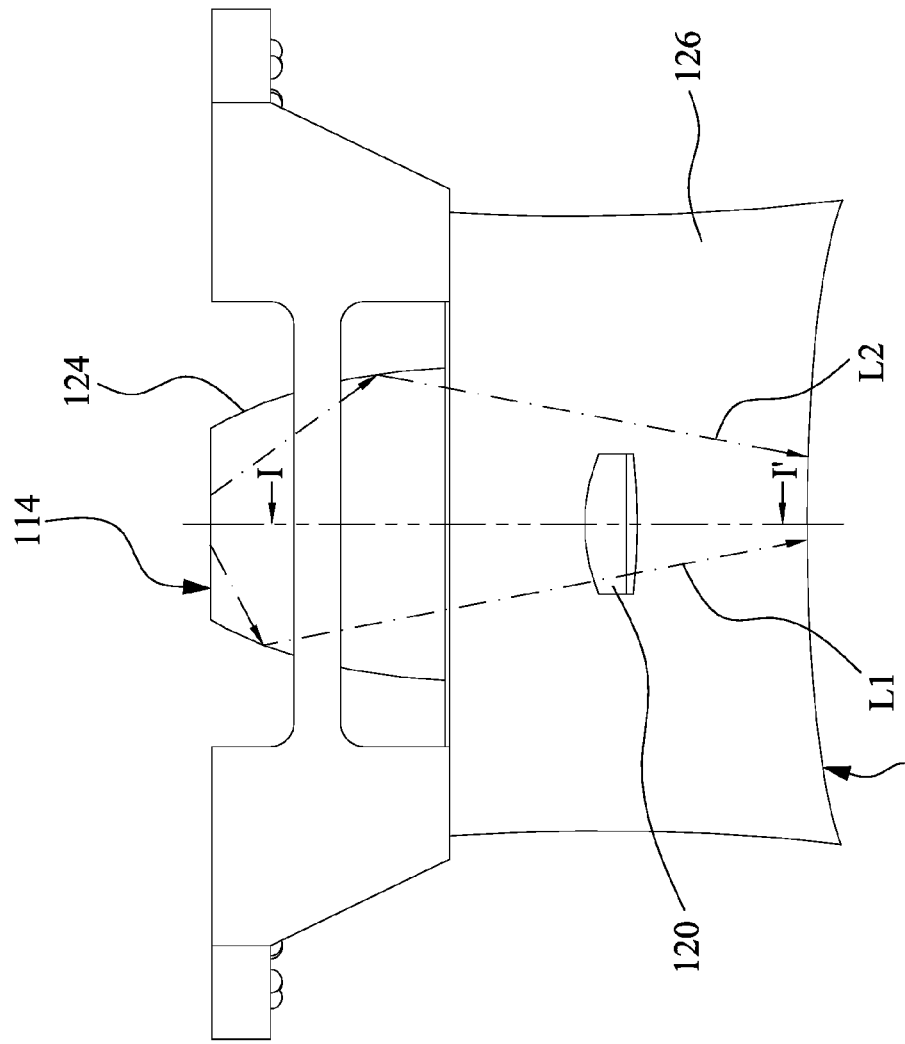
FIG. 6B is a top view of a light-guiding pillar of the vehicle lamp illustrated in FIG. 5.
Figure 6C:
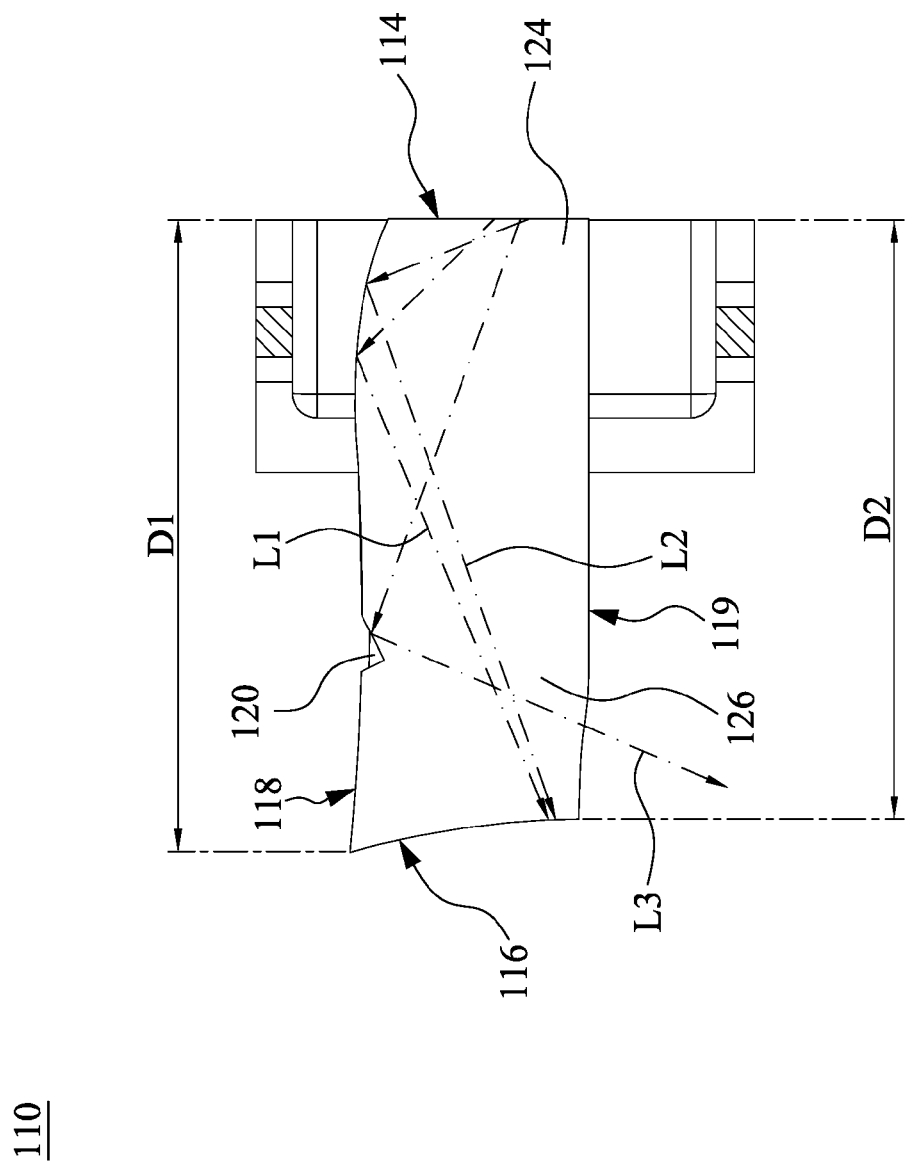
FIG. 6C is a cross-sectional view taken along line II' of a light-guiding pillar of the vehicle lamp illustrated in FIG. 6B.
Figure 6D:
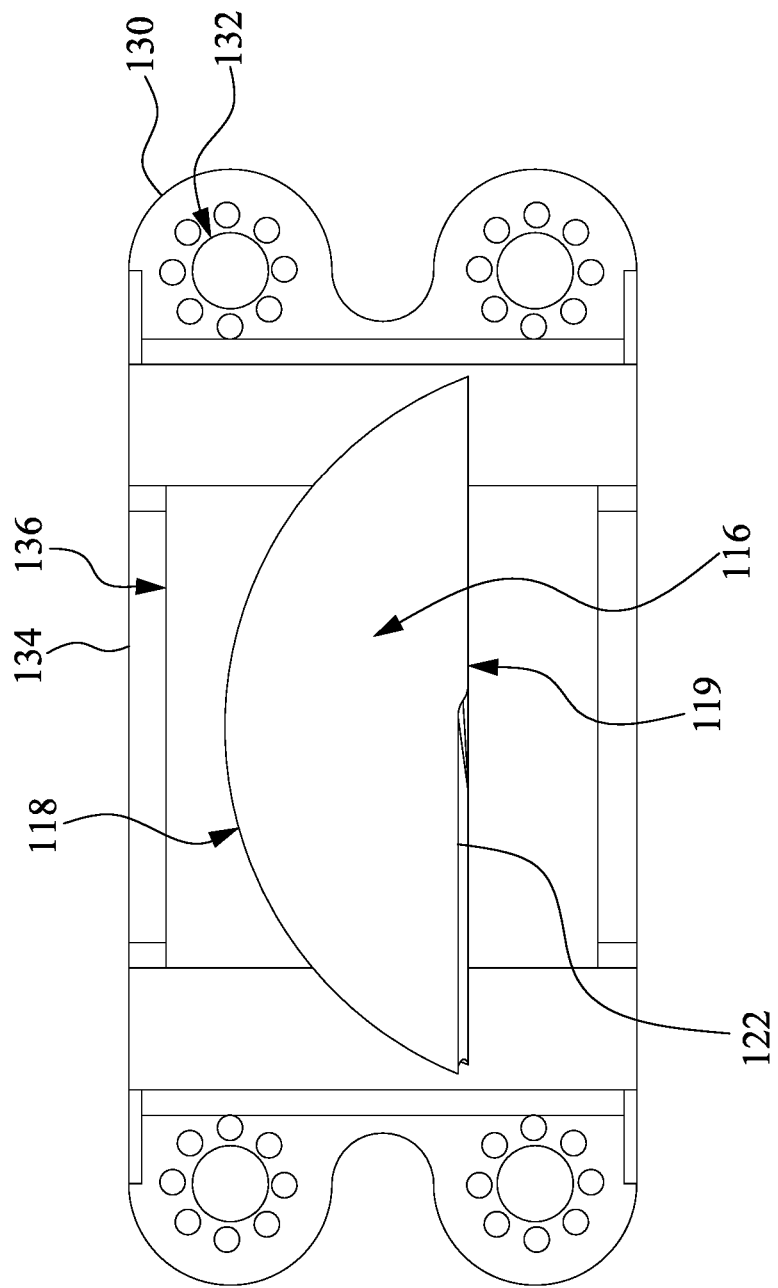
FIG. 6D is a front view of a light-guiding pillar of the vehicle lamp illustrated in FIG. 5.

FIG. 5 is a side view of a vehicle lamp 100 according to a third embodiment of the present disclosure. FIG. 6A is a perspective view of a light-guiding pillar 110 of the vehicle lamp 100 illustrated in FIG. 5. FIG. 6B is a top view of a light-guiding pillar 110 of the vehicle lamp 100 illustrated in FIG. 5. FIG. 6C is a cross-sectional view taken along line II' of a light-guiding pillar 110 of the vehicle lamp 100 illustrated in FIG. 6B. FIG. 6D is a front view of a light-guiding pillar 110 of the vehicle lamp 100 illustrated in FIG. 5.

As shown in FIGS. 5 and 6A to 6D, the difference between the present embodiment and the first embodiment is that the major structure 112 of the present embodiment further includes a light inlet portion 124 and a light outlet portion 126 connecting with each other.

In FIGS. 6A to 6D, the major structure 112 can be taken as being formed by the light inlet portion 124 and the light outlet portion 126 connecting with each other and adjacent to each other. Moreover, the light incident surface 114 and light outgoing surface 116 are respectively disposed on the light inlet portion 124 and the light outlet portion 126, and are opposite to each other.

In the present embodiment, at least one of the light inlet portion 124 and the light outlet portion 126 is composed by a partial graph of a three-dimensional curve. For example, the light inlet portion 124 can be designed according to the partial graph of a three-dimensional ellipse. Since the graph composed by the three-dimensional ellipse has a focal point (or a focal plane), the light inlet portion 124 can effectively guide the light beam entering the light incident surface 114 to the light outlet portion 126 by this focal point (or a focal plane). In other words, the three-dimensional curve composing the light inlet portion 124 is configured to focus the light beam entering the major structure 112 from the light incident surface 124 onto the light outgoing surface 116 by the light inlet portion 124, as the light beams L1 and L2 illustrated in FIGS. 6B and 6C. In some embodiments, the three-dimensional curve is a three-dimensional conic section, but is not limited thereto.

In addition, the light-guiding structure 120 is disposed on the light outlet portion 126. Similarly, each of the light inlet portion 124 and the light outlet portion 126 is a solid structure, and the light-guiding structure 120 is the concave configuration configured to define the total internal reflection interface. The light-guiding structure 120 is configured to guide another portion of the light beam entering the major structure 112 through the light incident surface 114 from the upper surface 118 to the bottom surface 119 with passing through the bottom surface 119, as the light beam L3 illustrated in FIG. 6C.

In the present embodiment, the light-guiding pillar 110 further includes the concave structure 122. The concave structure 122 is disposed on the bottom surface 119 and is adjacent to the light outgoing surface 116. The concave structure 122 is configured to define the boundary of the light beam emitted from the light outgoing surface 116. As previously described, with the refract mechanism provided by the condenser lens 106 (see FIG. 1), the image formed by the light beam provided by the light outgoing surface 116 of the light-guiding pillar 110 and the image formed by the light beam projected by the condenser lens 106 are reverse (the images are upside down to each other before and after projected by the condenser lens 106). Therefore, the concave structure 122 disposed on the bottom surface 119 can define the boundary B at the upper edge of the bright zone A1 of the illuminating area A (see FIG. 3), such that the shape of the light beam provided by the vehicle lamp 100 can meet the regulations of vehicle lighting.

In addition, in the present embodiment, the vertical distance between the light incident surface 114 and the light outgoing surface 116 is decreasing from the boundary between the light outgoing surface 116 and the upper surface 118 to the boundary between the light outgoing surface 116 and the bottom surface 119, as shown in FIG. 6C. For example, the vertical distance between the light incident surface 114 and the boundary between the light outgoing surface 116 and the upper surface 118 is distance D1, the vertical distance between the light incident surface 114 and the boundary between the light outgoing surface 116 and the bottom surface 119 is distance D2, and the distance D1 is smaller than the distance D2.

Similarly, the light outgoing surface 116 is not a vertical surface. In the arrangement of the light-guiding pillar 110 and the condenser lens 106 illustrated FIG. 6, the light outgoing surface 116 can be taken as a frontward surface, such that a portion of the focal plane 107 of the condenser lens 106 and the light outgoing surface 116 can be coincident with each other. In other words, the light outgoing surface 116 of the light-guiding pillar 110 is present within the focal plane 107.

Under this configuration, since the light outgoing surface 116 of the light-guiding pillar 110 is present within the focal plane 107, the effect of the light/dark cutoff in the illumination provided by the vehicle lamp 100 can be improved. In other words, in the bright zone of the illuminating area provided by the vehicle lamp 100, the contrast between the bright zone and zones around there is enhanced.

However, a person having ordinary skill in the art may choose a proper arrangement of the light outgoing surface 116 to design or modify the illumination provided by the vehicle lamp 100. For example, in the arrangement of the light-guiding pillar 110 and the condenser lens 106 of the first embodiment, the light outgoing surface 116 can be designed as the frontward surface. Alternatively, in the arrangement of the light-guiding pillar 110 and the condenser tens 106 of the third embodiment, the light outgoing surface 116 can be designed as the backward surface.

Furthermore, the light-guiding pillar 110 further includes a frame 134 and a positioning portion 130. The frame 134 has an opening 136, in which the major structure 112 is disposed in the opening 136 to connect with the frame 134. The major structure 112 and the frame 134 can be formed by one-piece, but are not limited thereto. The positioning portion 130 is disposed on the frame 134, in which the positioning portion 130 includes the positioning holes 132. The positioning element 138 is fastened on the heat-dissipation base 102 via the positioning hole 132 to fix the major structure 112 on the heat-dissipation base 102.

As described above, in the vehicle lamp of the present disclosure, by the light-guiding structure, the light beam provided by the light source can be emitted from the light outgoing surface and the bottom surface of the light-guiding pillar, in which the light beams emitted from the light outgoing surface and the bottom surface of the light-guiding pillar can be respectively projected to the bright zone and the dark zone of the illuminating area. Therefore, in the illuminating area that the vehicle lamp projects the light beam thereon, the dark zone is not complete dark but a little bright. In other words, the light-guiding structure can be taken as the brightness-improving structure for the dark zone, such that the brightness distribution in the illuminating area provided by the vehicle lamp can meet the regulations of vehicle lighting. Furthermore, with the refract mechanism provided by the condenser lens, the concave structure disposed on the major structure can define the boundary at the upper edge of the bright zone. By the concave structure, in the shape of the light beam provided by the vehicle lamp, the testing points near the cutoff line can be modified to meet the regulations of vehicle lighting.

Although the present disclosure has been described in considerable detail with reference to pertain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of present disclosure provided they fall within the scope of the following claims.

What is claimed is:

1. A light-guiding pillar used in a vehicle lamp, comprising:
a major structure having a light incident surface, a light outgoing surface, and an upper surface and a bottom surface disposed between the light incident surface and the light outgoing surface, wherein the upper surface and the bottom surface are opposite to each other, and the major structure is configured to guide a portion of a light beam entering the major structure through the light incident surface to the light outgoing surface; and
a light-guiding structure disposed on the upper surface, wherein a projection of the light-guiding structure on the upper surface is smaller than the upper surface, and the light-guiding structure is configured to guide another portion of the light beam entering the major structure through the light incident surface from the upper surface to the bottom surface with passing through the bottom surface.

2. The light-guiding pillar of claim 1, further comprising a concave structure disposed on the bottom surface, wherein the concave structure is adjacent to the light outgoing surface and is configured to define a boundary of the light beam emitted from the light outgoing surface.

3. The light-guiding pillar of claim 1, wherein at least one of the upper surface and the bottom surface is a curved surface protruding outward from the major structure.

4. The light-guiding pillar of claim 1, wherein the light outgoing surface is a surface that is curved and inward concave into the major structure.

5. The light-guiding pillar of claim 1, wherein a vertical distance between the light incident surface and the light outgoing surface is increasing or decreasing from a boundary between the light outgoing surface and the upper surface to a boundary between the light outgoing surface and the bottom surface.

6. The light-guiding pillar of claim 1, wherein the light-guiding structure is adjacent to the light outgoing surface.

7. The light-guiding pillar of claim 1, wherein the major structure is a hollow structure and has a hole, and the light beam guided by the light-guiding structure passes through the bottom surface via the hole.

8. The light-guiding pillar of claim 1, wherein the major structure is a solid structure, and the light-guiding structure is a concave configuration configured to define a total internal reflection interface.

9. The light-guiding pillar of claim 1, further comprising:
a positioning portion disposed on the major structure and comprising at least one positioning hole.

10. A vehicle lamp, comprising:
a heat-dissipation base;
a light source disposed on the heat-dissipation base and configured to provide a light beam;
a light-guiding pillar disposed on the heat-dissipation base, and comprising:
a major structure having a light incident surface, a light outgoing surface, and an upper surface and a bottom surface disposed between the light incident surface and the light outgoing surface, wherein the upper surface and the bottom surface are opposite to each other, the light incident surface is configured to receive the light beam provided by the light source, and the major structure is configured to guide a portion of the light beam entering the major structure through the light incident surface to the light outgoing surface; and
a light-guiding structure disposed on the upper surface, wherein a projection of the light-guiding structure on the upper surface is smaller than the upper surface, and the light-guiding structure is configured to guide another portion of the light beam entering the major structure through the light incident surface from the upper surface to the bottom surface with passing through the bottom surface; and
a condenser lens configured to receive the light beam provided by the light outgoing surface and the bottom surface.

11. The vehicle lamp of claim 10, wherein the condenser lens has a focal plane, and a portion of the focal plane and the light outgoing surface are coincident with each other.

12. The vehicle lamp of claim 10, wherein the condenser lens has a focal plane, and the focal plane and the light outgoing surface are at least intersected at a straight line.

13. The vehicle lamp of claim 10, wherein the light-guiding pillar further comprises a positioning portion disposed on the major structure, the positioning portion comprises at least one positioning hole, the vehicle lamp further comprises at least one positioning element, and the positioning element is fastened on the heat-dissipation base via the positioning hole to fix the major structure on the heat-dissipation base.

14. The vehicle lamp of claim 10, wherein the light-guiding pillar further comprises a concave structure disposed on the bottom surface, and the concave structure is adjacent to the light outgoing surface and is configured to define a boundary of the light beam emitted from the light outgoing surface.

15. The vehicle lamp of claim 10, wherein at least one of the upper surface and the bottom surface is a curved surface protruding outward from the major structure.

16. The vehicle lamp of claim 10, wherein the light outgoing surface is a surface that is curved and inward concave into the major structure.

17. The vehicle lamp of claim 10, wherein a vertical distance between the light incident surface and the light outgoing surface is increasing or decreasing from a boundary between the light outgoing surface and the upper surface to a boundary between the light outgoing surface and the bottom surface.

18. The vehicle lamp of claim 10, wherein the light-guiding structure is adjacent to the light outgoing surface.

19. The vehicle lamp of claim 10, wherein the major structure is a hollow structure and has a hole, and the light beam guided by the light-guiding structure passes through the bottom surface via the hole.

20. The vehicle lamp of claim 10, wherein the major structure is a solid structure, and the light-guiding structure is a concave configuration configured to define a total internal reflection interface.

* * * * *